No. 773,702.

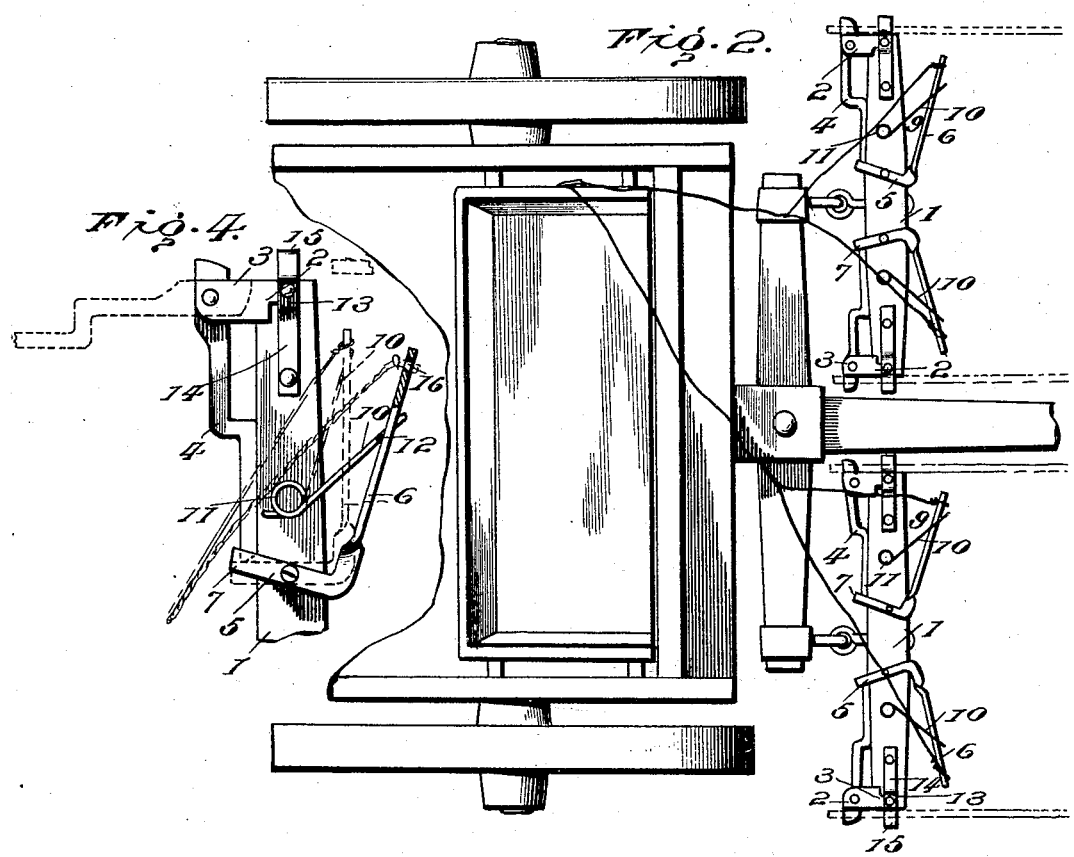

Patented November 1, 1904.

UNITED STATES PATENT OFFICE.

WILLIAM WETHERFORD ARNOLD, OF MOUNT JULIET, TENNESSEE.

HORSE-DETACHER.

SPECIFICATION forming part of Letters Patent No. 773,702, dated November 1, 1904.

Application filed March 2, 1904. Serial No. 196,185. (No model.)

*To all whom it may concern:*

Be it known that I, WILLIAM WETHERFORD ARNOLD, a citizen of the United States, residing at Mount Juliet, in the county of Wilson and State of Tennessee, have invented certain new and useful Improvements in Horse-Detachers, of which the following is a specification.

My invention relates to an improved device to be applied to swingletrees or whiffletrees to permit release or detachment of the traces by which the draft-animal is secured to a vehicle should the animal make any attempt to run away or should it be desirable to instantly detach the traces on account of balking or the like. The invention provides operating means within reach of the driver of the vehicle which when properly actuated will effect the release of the animal or animals from the shafts at the desired moment.

For a full description of the invention and the merits thereof and also to acquire a knowledge of the details of construction of the means for effecting the result reference is to be had to the following description and accompanying drawings.

While the essential and characteristic features of the invention are susceptible of modification, still the preferred embodiment of the invention is illustrated in the accompanying drawings, in which—

Figure 1 is a perspective view showing the invention applied. Fig. 2 is a plan view showing the relative arrangement of the attaching devices carried by the whiffletree. Fig. 3 is a detail perspective view of one of the detaching-levers. Fig. 4 is a detail view, parts broken away, showing the operating positions of the trace-lever.

Corresponding and like parts are referred to in the following description and indicated in all the views of the drawings by the same reference characters.

The invention comprises any ordinary type of whiffletree 1, to which the traces are adapted to be attached when the device is in working position. Extending rearwardly from the end portions of the whiffletree 1 are pivot members 2, which are provided with spaced ears 3, either integrally or separably formed, between which are pivoted trace-levers 4. The trace-levers 4 are pivoted at points between their ends, one end of each lever 4 being extended outwardly from the pivot member 2 to which it is secured, so as to receive the end portion of an adjacent trace. The opposite end of each trace-lever 4 is extended rearwardly adjacent the body of the whiffletree and is engaged by a rearwardly-extending arm 5 of a detaching-lever 6. A detaching-lever 6 is provided for coöperation with each of the trace-levers 4, the said levers 6 being mounted upon the whiffletrees by means of a pivotal connection of the arms 5 thereof to the whiffletree 1. The respective arms 5 of the levers 6 are provided at their rear ends with downwardly-extending lugs 7, said lugs being further formed with supporting extensions 8. The lugs 7 constitute the engaging means between the arms 5 of the detaching-levers 6, said lugs coöperating with the inner ends of the trace-levers 4 to hold the said levers 4 in the position clearly shown in Fig. 2. Springs 9 are interposed between the body of the whiffletree 1 and the detaching-levers 6, and said springs serve to hold the lugs 7 in engagement with the inner ends of the trace-levers 4 as their normal position. The extensions 8 of the lugs 7 support the ends of the trace-levers 4, which are engaged by the said lugs, preventing downward movement of the inner ends of the trace-levers and reinforcing the pivotal connection of the said levers 4 with the pivot members 2. The springs 9, which engage the detaching-levers 6, are of peculiar form, consisting of spaced arms 10, extended from the upper and lower sides of the whiffletree, each of said arms being provided with spring-coils 11, the securing-fastenings by which the springs are secured to the whiffletree being disposed adjacent the coils 11. The outer end portions of the springs 9 are bent so as to provide seats 12, formed by deflections in the wire and from which the springs 9 are made. The seats 12 of the springs 9 prevent loosening movement of the detaching-levers in a manner which will be readily comprehended.

To positively hold the traces in engagement with the outer end portions of the trace-levers 4, spring-clips 13 are secured to the end portions of the whiffletree, said clips engaging the trace adjacent to the respective ends of the whiffletree 1, so as to prevent accidental displacement of the traces. The clips 13 comprise a securing-shaft 14 and a hook 15, constituting a trace-engaging member.

The outer ends of the detaching-levers 6 are provided with openings 16, preferably, and operating-cords or any other analogous operating means may be secured to the detaching-levers to effect a pivotal movement thereof, so as to cause disengagement of the lugs 7 from the inner ends of the trace-levers 4. It will be noted that when the levers 6 are actuated, as above described, the draft upon the outer ends of the trace-levers 4 will immediately throw the said levers rearwardly by a pivotal movement thereof, and the traces will slip from the ends of the levers 4, the detachment or release of the draft-animal being thus effected. The draft animal or animals may be suitably attached to the shaft, so as to be adapted for release therefrom as soon as the traces are disengaged from the trace-levers 4.

The operating-cords by which the detaching-levers 6 are manipulated are designed to be disposed in convenient reach of the driver of the vehicle, so as to permit of the release of the horse or draft animal or animals at a moment's notice. The parts of the detaching device are to be suitably finished in nickel-plate or the like, in accordance with the vehicle to which they are applied, and since the said parts are very simply constructed and mounted the invention may be cheaply manufactured.

Having thus described the invention, what is claimed as new is—

In a horse-detaching device, the combination of a whiffletree, pivot members secured to the end portions of the whiffletree and extended rearwardly therefrom, trace-levers pivoted between their ends to the pivot members of the whiffletree, the outer ends of the trace-levers being adapted to engage the traces, detaching-levers provided with rearwardly-extending arms, pivot-fastenings securing the arms of the detaching-levers to the whiffletree, downwardly-extending lugs projected from the rear ends of the arms of the detaching-levers, supporting extensions carried by said lugs, the lugs being adapted to normally engage the inner ends of the trace-levers, springs interposed between the whiffletree and the detaching-levers, and clips secured to the end portions of the whiffletree and provided with hooks to engage the traces for the purpose set forth.

In testimony whereof I affix my signature in presence of two witnesses.

WILLIAM WETHERFORD ARNOLD. [L. S.]

Witnesses:
   I. H. SMITH,
   W. G. CAWTHON.